United States Patent
Barba

(10) Patent No.: US 6,224,022 B1
(45) Date of Patent: May 1, 2001

(54) AIRPLANE HIGH LIFT SURFACE DRIVE SYSTEM

(75) Inventor: Valentin Barba, Scotrun, PA (US)

(73) Assignee: Smiths Industries Actuation Systems Inc., Whippany, NJ (US)

( * ) Notice: Subject to any disclaimer, the term of this patent is extended or adjusted under 35 U.S.C. 154(b) by 0 days.

(21) Appl. No.: 09/258,470

(22) Filed: Feb. 26, 1999

(51) Int. Cl.[7] ................................... B64C 13/50
(52) U.S. Cl. ................. 244/228; 244/212; 244/215
(58) Field of Search .................. 244/228, 212, 244/213, 211, 215, 90 R, 75 R; 310/112, 113, 114; 318/113

(56) References Cited

U.S. PATENT DOCUMENTS

| | | | |
|---|---|---|---|
| 1,373,873 | * | 4/1921 | Emmet . |
| 1,407,425 | * | 2/1922 | Junkers . |
| 1,802,184 | * | 4/1931 | Pollock . |
| 1,856,093 | * | 5/1932 | Ford et al. . |
| 2,315,110 | * | 3/1943 | Dornier . |
| 3,935,754 | | 2/1976 | Comollo ........................ 74/665 F |
| 3,958,779 | * | 5/1976 | Townsend ........................ 244/75 R |
| 4,159,642 | * | 7/1979 | Hudson et al. . |
| 4,398,683 | * | 8/1983 | Schmetzer . |
| 4,633,984 | | 1/1987 | Hudson .................................. 192/9 |
| 4,688,744 | * | 8/1987 | Aldrich . |
| 4,695,014 | * | 9/1987 | Mourani . |
| 4,779,822 | * | 10/1988 | Burandt et al. . |
| 4,802,544 | * | 2/1989 | Maeda . |
| 5,535,481 | * | 7/1996 | Hartmeier et al. . |
| 5,686,907 | * | 11/1997 | Bedell et al. . |
| 5,720,222 | * | 2/1998 | Reichardt et al. . |
| 5,884,872 | * | 3/1999 | Greenhalgh . |
| 6,053,842 | * | 4/2000 | Kitada et al. . |

FOREIGN PATENT DOCUMENTS 0 483 504 A1   5/1992   (EP) .............................. B64C/13/24

* cited by examiner

*Primary Examiner*—Charles T. Jordan
*Assistant Examiner*—Tien Dinh
(74) *Attorney, Agent, or Firm*—Fish & Neave; Robert R. Jackson; Martin A. Leroy

(57) ABSTRACT

An airplane high lift surface drive system having a first actuator connected to a first high lift surface and a second actuator connected to a second high lift surface, wherein the first actuator is electrically connected to the second actuator in series.

14 Claims, 3 Drawing Sheets

AIRPLANE HIGH LIFT SURFACE DRIVE SYSTEM

BACKGROUND OF THE INVENTION

This invention relates to an apparatus for controlling airplane high lift surfaces, and more specifically, airplane leading edge flaps, or slats, or trailing edge flaps.

One type of prior art airplane flap drive system uses a centrally located power drive unit with mechanical transmission to the flap locations. The power drive unit includes either an electrical motor, a hydraulic motor or both types of motor. Because the power drive unit is not located at the flap locations, additional transmission components are required to connect the power drive unit to the flaps.

Another type of prior art airplane flap drive system uses separate power drive units positioned at each flap location. Each power drive unit includes an electric motor having its own controller. During repositioning of the flaps, both flaps require approximately the same torque output (within a given tolerance) from their respective drive motors. A separate controller is used to drive each motor such that both flaps move in a similar manner. Any position difference between the left and right flaps is eliminated through use of a synchronizer mechanism such as a torque bar.

In view of the foregoing, it is an object of this invention to provide a simplified airplane high lift surface drive system apparatus.

It is also an object of this invention to provide an airplane high lift surface drive system apparatus that eliminates the need for multiple controllers and that drives airplane flaps.

It is another object of this invention to provide an airplane high lift surface drive system apparatus that eliminates the need for multiple controllers and includes power drive units or actuators positioned near the flap locations.

SUMMARY OF THE INVENTION

These and other objects of the invention are accomplished in accordance with the principles of the invention by using multiple drive motors that are electrically connected to each other in series and are governed by a single controller.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
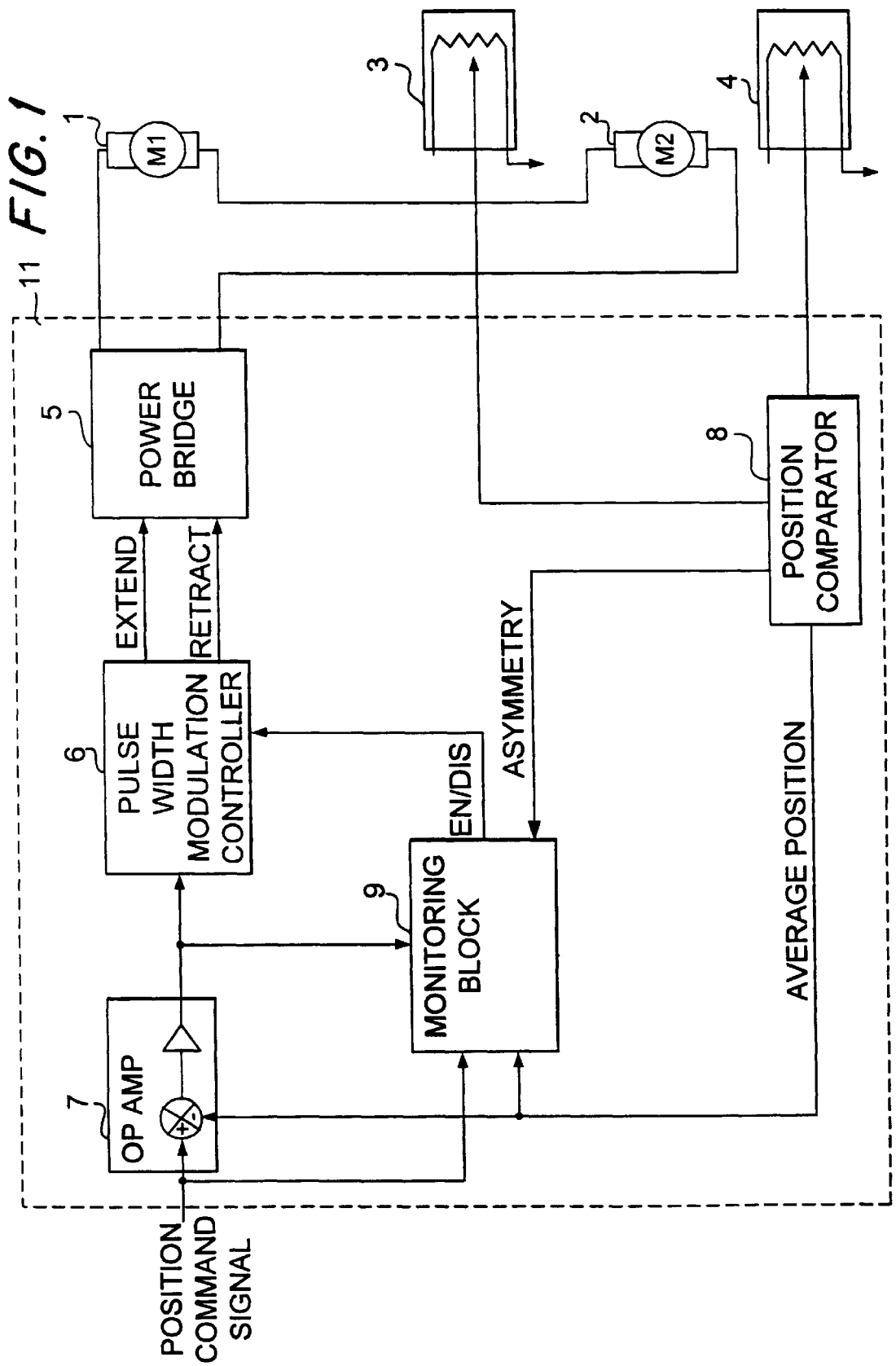
FIG. 1 is a schematic diagram of one embodiment of the circuitry of the invention.
Figure 2:
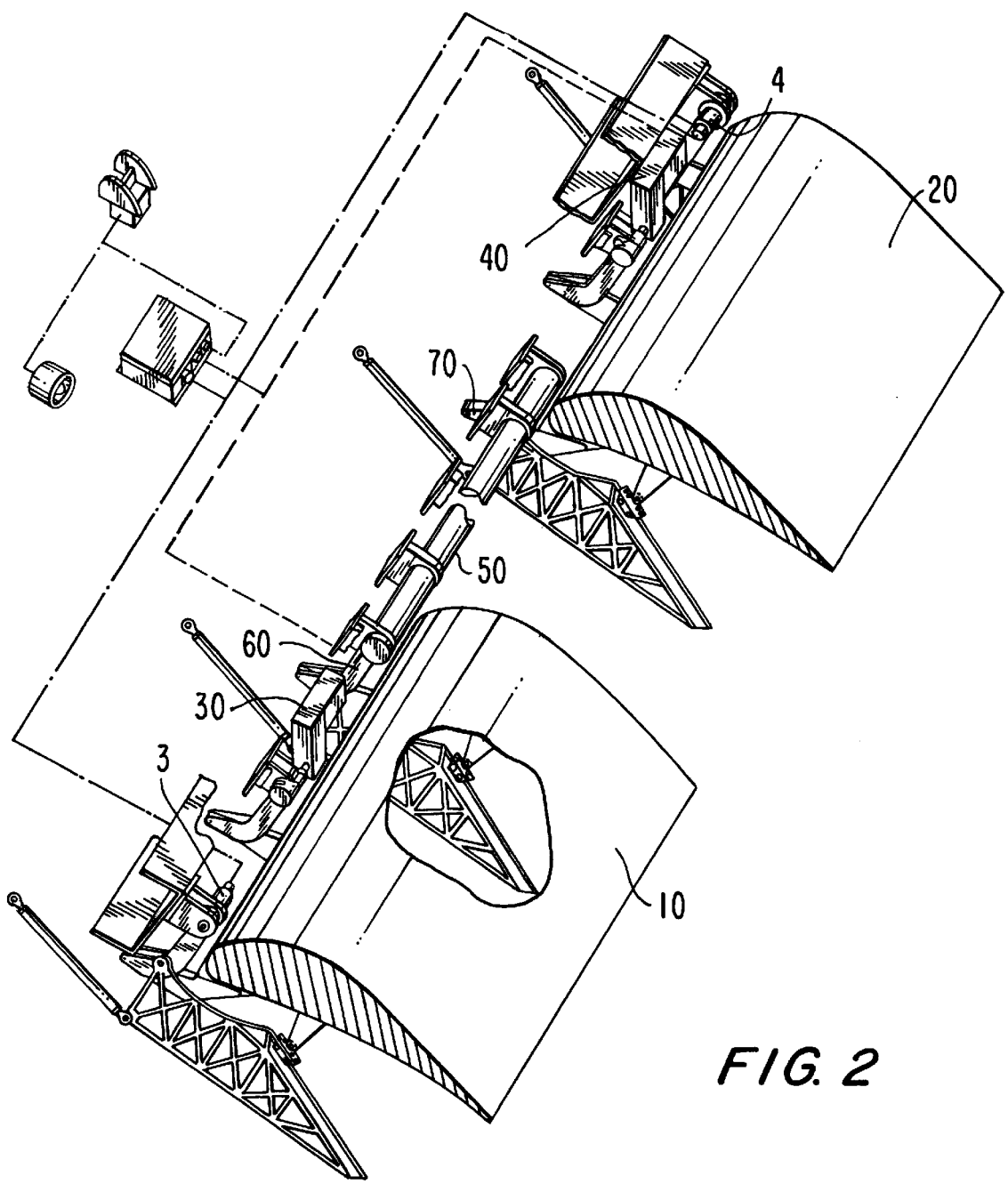
FIG. 2 is a perspective view of one embodiment of the invention.

FIG. 1 is a schematic diagram of a preferred embodiment of the invention. FIG. 2 is a perspective view of a preferred embodiment of the invention. Referring to FIGS. 1 and 2, motor 1 and motor 2 are similar, preferably direct current, motors included in actuator 30 and actuator 40 (shown in FIG. 2), respectively. Actuators 30 and 40 drive high lift surfaces 10 and 20 (shown in FIG. 2), respectively. High lift surfaces 10 and 20 may be left and right trailing edge flaps or left and right leading edge flaps (slats). Positioning actuators 30 and 40 at the high lift surface locations eliminate the need for extended transmission components that would be necessary if the high lift surfaces were driven from a centrally located power drive unit.

Referring to FIG. 1, motors 1 and 2 are electrically connected in series to each other and therefore share the same current. Because torque and current are related monotonically in direct current motors and motors 1 and 2 share the same current, motors 1 and 2 produce approximately the same torque (within a given tolerance). A single controller 11 regulates the current provided to motors 1 and 2 that drives the motors in a similar manner. Separate controllers for motors 1 and 2 are not needed to drive the motors and move their loads in a similar manner.

Motors 1 and 2 are connected to power bridge 5. Power bridge 5 produces the output of controller 11 and is wired in series with motors 1 and 2. Position detector 3 and position detector 4 are potentiometers or resolvers that provide signals indicative of the position of high lift surfaces 10 and 20 driven by actuator 30 and actuator 40, respectively. Position detectors 3 and 4 are connected to position comparator 8 which produces a position feedback signal corresponding to the average of the positions of high lift surfaces 10 and 20. Position comparator 8 also produces a signal indicative of asymmetry between position detectors 3 and 4. The position feedback signal is summed with a position command signal in operational amplifier 7 to generate an error signal. The position command signal is a steady electrical potential corresponding to a desired high lift surface position selected by the system operator. Monitoring block 9 receives the error signal and enables or disables pulse width modulation controller 6 according to several control factors, including the level of asymmetry between position detectors 3 and 4. If enabled by monitoring block 9, pulse width modulation controller 6 drives power bridge 5 to run motors 1 and 2 in the proper direction to cancel the error signal. Monitoring block 9 disables pulse width modulation controller 6 when the error signal falls below a certain value.

During normal operation, the high lift surface drive system moves the left and right high lift surfaces such that they synchronously extend and retract. Motors 1 and 2 both generate torque corresponding to the current provided by power bridge 5. Because motors 1 and 2 may experience different loads causing the resulting position of high lift surfaces 10 and 20 to differ, a torque transfer mechanism between motors 1 and 2 must be used to assure synchronous movement of the high lift surfaces and the same resultant position. Referring to FIG. 2, one embodiment of the invention includes a torque tube 50 for transferring torque between motors 1 and 2 as necessary to assure synchronous movement of high lift surfaces 10 and 20. Torque tube 50 is connected between high lift surfaces 10 and 20 through attachment to high lift surface hanger arms 60 and 70, respectively. In order to assure synchronization, the torque transfer mechanism may be attached between the high lift surfaces either directly, or indirectly through other components, including attachment to outputs of the electric motors.

Figure 3:
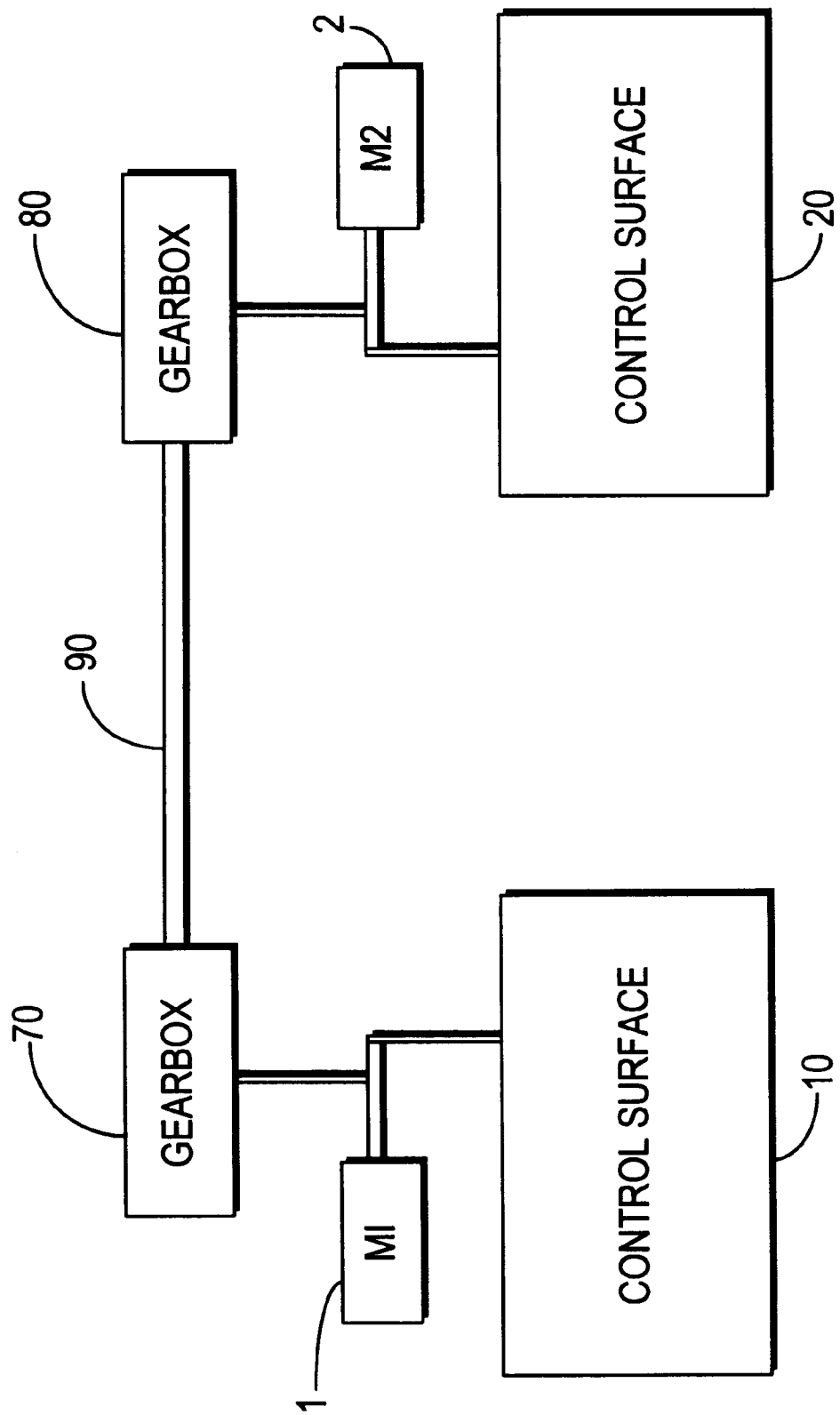
FIG. 3 is a schematic diagram of a portion of another embodiment of the invention.

FIG. 3 is a schematic diagram showing an alternate means for transferring torque between motors to assure synchronous movement of high lift surfaces 10 and 20. Shaft 90 is a relatively low-weight synchronizing shaft that is mechanically connected to the outputs of motors 1 and 2 through step up gearboxes 70 and 80.

One skilled in the art will appreciate that the present invention can be practiced by other than the described embodiments, which are presented here for purposes of illustration and not of limitation, and the present invention is limited only by the claims that follow.

The invention claimed is:

1. An airplane high lift surface drive system comprising:
   a first electric motor drivingly coupled to a first high lift surface;
   a second electric motor drivingly coupled to a second high lift surface wherein said first and second electric motors are electrically connected in series with one another; and
   a means for assuring synchronous movement of said first high lift surface and said second high lift surface wherein said means is mechanically attached between said first high lift surface and said second high lift surface.

2. The apparatus defined in claim 1 wherein said high lift surfaces are flaps.

3. The apparatus defined in claim 1 wherein said first electric motor and said second electric motor are direct current motors.

4. The apparatus defined in claim 1 further comprising a controller electrically connected in series to said first electric motor and said second electric motor.

5. The apparatus defined in claim 1 wherein said first electric motor and said second electric motor are direct current motors, and further comprising a controller electrically connected in series to said first electric motor and said second electric motor.

6. The apparatus defined in claim 1 wherein said high lift surfaces are flaps, and further comprising a controller electrically connected in series to said first electric motor and said second electric motor.

7. The apparatus defined in claim 1 wherein said high lift surfaces are flaps, wherein said first electric motor and said second electric motor are direct current motors, and further comprising a controller electrically connected in series to said first electric motor and said second electric motor.

8. The apparatus defined in claim 1 wherein said means for assuring synchronous movement of said first high lift surface and said second high lift surface is a torque bar.

9. The apparatus defined in claim 1 wherein said means for assuring synchronous movement of said first high lift surface and said second high lift surface is a torque bar, and wherein said first electric motor and said second electric motor are direct current motors.

10. The apparatus defined in claim 1 wherein said means for assuring synchronous movement of said first high lift surface and said second high lift surface is a torque bar, wherein said first electric motor and said second electric motor are direct current motors, and further comprising a controller electrically connected in series to said first electric motor and said second electric motor.

11. The apparatus defined in claim 1 wherein said means for assuring synchronous movement of said first high lift surface and said second high lift surface comprises:
   a first step up gearbox mechanically connected to an output of said first electric motor;
   a second step up gearbox mechanically connected to an output of said second electric motor; and
   a shaft mechanically connecting said first step up gearbox and said second step up gearbox.

12. The apparatus defined in claim 1 wherein said first electric motor and said second electric motor are direct current motors, and wherein said means for assuring synchronous movement of said first high lift surface and said second high lift surface comprises:
   a first step up gearbox mechanically connected to an output of said first electric motor;
   a second step up gearbox mechanically connected to an output of said second electric motor; and
   a shaft mechanically connecting said first step up gearbox and said second step up gearbox.

13. The apparatus defined in claim 1 further comprising a controller electrically connected in series to said first electric motor and said second electric motor, wherein said first electric motor and said second electric motor are direct current motors, and wherein said means for assuring synchronous movement of said first high lift surface and said second high lift surface comprises:
   a first step up gearbox mechanically connected to an output of said first electric motor;
   a second step up gearbox mechanically connected to an output of said second electric motor; and
   a shaft mechanically connecting said first step up gearbox and said second step up gearbox.

14. The apparatus defined in claim 1 wherein said first electric motor and said second electric motor are direct current motors, and further comprising:
   a first position detector for generating a signal indicative of the position of said first high lift surface;
   a second position detector for generating a signal indicative of the position of said second high lift surface;
   a pulse width modulation controller connected to a power bridge for regulating the electric current supplied by said power bridge to said first electric motor and said second electric motor;
   a monitoring block connected to said pulse width modulation controller for enabling and disabling said pulse width modulation controller;
   a position comparator connected to said first position detector and said second position detector and having a position feedback signal; and
   a comparator for receiving a position command signal and combining said position command signal with said position feedback signal to generate an error signal wherein said error signal is provided to said monitoring block and said pulse width modulation controller.

* * * * *